Jan. 10, 1956  J. F. McDONALD  2,730,054

EARTH CONDITIONING AND SEEDING MACHINE

Filed May 28, 1952

INVENTOR
Joseph F. McDonald

BY Winston E. Miller
Dean Lawrence
ATTORNEYS

United States Patent Office 2,730,054
Patented Jan. 10, 1956

---

2,730,054

EARTH CONDITIONING AND SEEDING MACHINE

Joseph F. McDonald, Saginaw, Mich.

Application May 28, 1952, Serial No. 290,509

1 Claim. (Cl. 111—10)

This invention relates to earth conditioning and seeding machines and more particularly to a self-contained power driven machine comprising hoppers, rollers, and a rake.

The present method of preparing and seeding lawns involves a series of difficult, time consuming tasks. If the ground is hard, it must be spaded before fertilizer is sprinkled over the soil. The large lumps of soil that remain after spading must be broken up before seeds can be distributed over the soil's surface. Then the soil must be raked in order to cover over the seeds. It is usual, at this point, to roll a heavy weight over the seeded soil in order to firmly embed the seeds in the earth. This old-fashioned, time consuming procedure is seldom commensurate with the resulting lawn, primarily because of the failure to distribute seeds evenly over the lawn's surface, and then, of providing ways to insure that the seeds will grow and develop.

With a view towards obviating these deficiencies, I have provided a self-contained power driven earth conditioning and seeding machine which will readily accomplish all of the afore-mentioned acts in a comparatively negligible period of time. The present invention is mechanically perfected to negotiate with facility the normal area wherein an average lawn is planted, and is constructed to enable each user to have with little effort an even, healthy lawn.

Another object of the present invention is to provide a machine which can be simply and economically manufactured for use in preparing lawns and the like.

A further object of the present invention is to provide a machine that will evenly distribute seeds over the soil, and so embed the seeds in the soil that they will not be available to birds or blown away by the wind.

These and other objects and purposes of the invention will become apparent to persons familiar with this type of equipment upon reference to the accompanying drawings and upon reading the following specification.

In meeting the above objects and purposes, as well as others incidental thereto and associated therewith, I have utilized an earth conditioning and seeding machine comprising rollers, hoppers, and a rake mounted thereon, so adapted to operate in conjunction with power driving means which propels the machine in a forward direction. As well, I have provided manually operated means for distributing fertilizer and seeds from said hoppers.

For an illustration of a preferred embodiment of this invention, attention is directed to the accompanying drawings in which:

Figure 1 is a side elevational view of the machine, showing the driving means and the various attachments for preparing and seeding lawns and the like;

Figure 1:
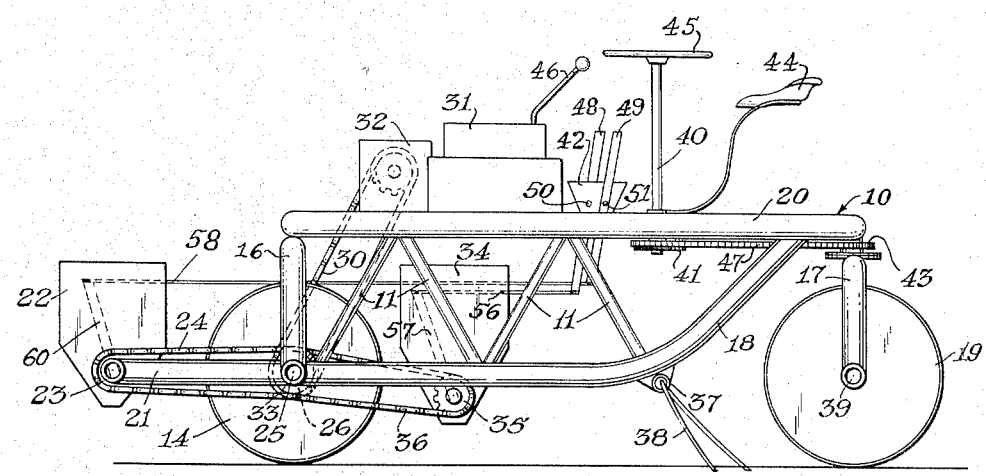
Figure 2:
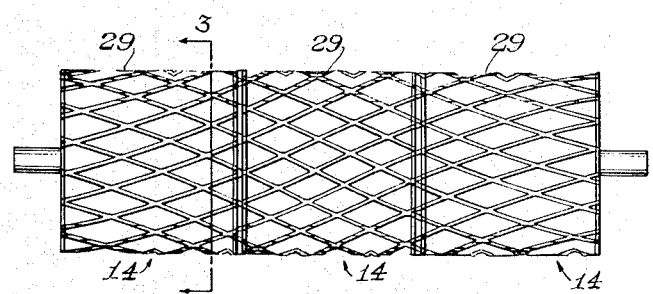
Figure 2 is a front elevational view of the front roller showing the open latticework about its periphery.
Figure 3:
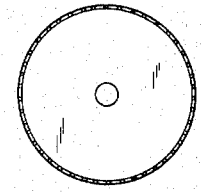
Figure 3 is a sectional view of the front roller taken on line 3—3 of Figure 2 and looking from right to left.

Referring now to the drawings, the numeral 10 indicates generally a rectangular frame having bars 20 positioned longitudinally, and connected transversely by bars (not shown), said longitudinal bars forming an apex directly above the U-shaped leg 17. The U-shaped leg 16 is welded to the longitudinal bars. The legs 18 are attached to the longitudinal bars 20 and have extension bars 21 extending horizontally forward of the front roller 14. Likewise, the legs 18 are transversely connected by bars (not shown) and are further supported by the strengthening bars 11. The front hopper 22 is held in position by said extension bars 21 and has a sprocket 23 which is rotatably mounted on an axle in direct connection with a circular conveyor, said conveyor being transversely positioned inside the front hopper. The said sprocket is connected by means of a chain 24 to a sprocket 26 which is rotatably mounted on the axle of said front roller. The rear hopper 34 is substantially identical with the front hopper 22 and also has a circular conveyor transversely positioned inside said hopper, said conveyor being rotatably attached to the sprocket 35, which is in direct connection by the chain 36 to a sprocket 33 that is rotatably mounted on the axle of said front roller. Power driving means are supplied to the machine by the engine 31, adjacent the transmission 32, said transmission being connected by the chain 30 to said sprocket 23 about the axle of said front roller. A rake bar 37 is transversely attached to the legs 18 of said frame 10 at points generally below the steering post 30, said rake bar comprising rake tines 38. A seat 44 is positioned on said frame so that the operator can steer the machine by turning the wheel 45 attached to the steering post 40. As well, the operator can manipulate the engine and shift the gears in said transmission 32 by use of the shifting gear 46. A sprocket 41 is vertically positioned below the steering post 40 and is connected by means of a chain 47 to a vertically positioned sprocket 43 on said U-shaped leg 17. As the operator turns said wheel 45, he can control the forward direction of the machine through its rear roller 19, mounted on said U-shaped leg 17 by the axle 39. The rear roller 19 includes three axially aligned drums (not shown), each drum being independently rotatable. The front roller constitutes one unit, supported by bands about its circumference and having open latticework 29 about its outer periphery.

Attached to said frame 10 is a plate 42, tapped to provide bushings for bolts 50 and 51. When the lever 48 is moved in a forward direction, it revolves about said bolt 50 and engages a connector 56, said connector being attached to a bar 57 that is rotably connected to an exit opening under said hopper 34. Likewise, the lever 49 is supported to said plate 42 by a bolt 51, said lever being attached by the connector 58 to a bar 60 which is rotatably connected to an exit opening under said hopper 22.

*Operation*

In operating the machine, the front hopper is filled with fertilizer and the rear hopper is filled with seeds. The rake tines are adjusted to the desired length, so as to insure constant contact with the ground. In the embodiment shown, the rear roller is constructed of a heavy, close-faced material, but lighter rollers can be used. After the levers 48 and 49 are moved to a forward position, the slots under the seed and fertilizer hoppers are opened. If the machine is to be used as a roller, the levers 48 and 49 are pulled toward the operator and the exit slots of the feed hopper and the fertilizer hopper are closed.

After the engine is started, forward motion can be given to the machine, and the conveyor in the front hopper can be made to rotate so as to drop fertilizer upon the soil. Likewise, the seed hopper conveyor will drop seeds in the soil before the soil is raked and rolled by the rear roller. Since the front roller is open-faced, it breaks up the lumps of soil and intimately mixes the soil and the fertilizer together. The passage of the front roller over the soil leaves intermittent shallow impressions, which act to deep-seat the seeds and thereby provide for a stronger and healthier lawn than that produced by mere surface seeding. The seeds are evenly distributed by the seed hopper, and as the rake passes over the seeded ground it covers over the seeds and fills in the shallow intermittent depressions left by the rotation of the front roller. The rear roller finally passes over the soil and packs the ground beneath it, leaving an even, smooth surface devoid of the usual foot and heel prints, and disk marks generally apparent in new lawns.

It is thereby seen that in one passage of my machine over the ground, the soil is completely prepared for seeding, seeded, raked, and rolled to produce a deep-rooted lawn which does not require reseeding because of failure to provide for an even distribution of seeds.

It is to be understood that if the ground to be rolled has already been bull-dozed and is in a condition where one passage of the front roller would not thoroughly break up the lumps of ground to a fineness desirable in planting lawn seeds, then the rear roller of my machine may be removed and an open-faced roller may be substituted therefor. Likewise, when rolling an established lawn it may also be necessary to use both a close-faced front roller and a close-faced rear roller. When this is done, the machine is used only as a leveling and fertilizing unit and seeds are not sown.

Although specific reference has been made in the foregoing to the use of the machine as a lawn preparing and seeding device, it will be appreciated that the said machine is equally applicable for other operations. Furthermore, although the above mentioned drawings and descriptions apply to one particular embodiment of the invention, it is not my intention, implied or otherwise, to eliminate other variations or modifications which do not depart from the scope of the invention unless specifically stated to the contrary in the hereinafter appended claim.

I claim:

A self propelled machine for simultaneously conditioning, texturing uniformly, and seeding a rough soil surface including: a generally rectangular frame provided with wheel journals at either end; a pattern impressing front roller having a face of expanded metal and journaled transversely of said frame at one end; a fertilizer distributing hopper supported on said frame ahead of said front roller and of substantially equal width to said front roller and in parallel relation thereto; a seed distributing hopper supported on said frame rearwardly of said front roller and transversely of said frame for sowing seed in a path substantially equal in width to the width of said front roller; a rake bar supported on said frame behind said seed hopper provided with a plurality of adjustable ground engaging tines for striating the ground with a pattern of shallow grooves paralleling the line of travel of said machine and superimposed over the roller impressed pattern; a turnable rear roller having a face of expanded metal and being journaled on the rear end of said frame for imparting an overlying ground impressing pattern to the soil and mounted transversely of said frame and of a size substantially equal to the said front roller; a motor on said frame driving said front roller; controls on said frame selectively operating said seed and fertilizer hoppers; and steering means on said frame drivably connected to the said rear roller for steering the same.

References Cited in the file of this patent

UNITED STATES PATENTS

| | | |
|---|---|---|
| 335,966 | Shaw | Feb. 9, 1886 |
| 350,914 | Corbin | Oct. 19, 1886 |
| 746.654 | Adair | Dec. 15, 1903 |
| 1,174,899 | Rupert | Mar. 7, 1916 |
| 1,221,742 | Kelly | Apr. 3, 1917 |
| 1,839,000 | Phan-Quang | Dec. 29, 1931 |
| 1,897,769 | Seiser | Feb. 14, 1933 |
| 1,914,915 | Handler | June 20, 1933 |
| 2,026,460 | Cobb | Dec. 31, 1935 |
| 2,066,610 | Carlin | Jan. 5, 1937 |